(12) United States Patent  
Moshavi et al.

(10) Patent No.: US 9,344,303 B1  
(45) Date of Patent: May 17, 2016

(54) ADAPTIVE SIGNAL COVARIANCE ESTIMATION FOR MMSE EQUALIZATION

(71) Applicant: Marvell International Ltd., Hamilton (BM)

(72) Inventors: Shimon Moshavi, Bet Shemesh (IL); Rony Ashkenazi, Moshav Kidron (IL); David Ben-Eli, Modi'in (IL); Daniel Yellin, Ra'anana (IL)

(73) Assignee: Marvell International Ltd., Hamilton (BM)

( * ) Notice: Subject to any disclaimer, the term of this patent is extended or adjusted under 35 U.S.C. 154(b) by 357 days.

(21) Appl. No.: 13/733,154

(22) Filed: Jan. 3, 2013

Related U.S. Application Data

(60) Provisional application No. 61/583,128, filed on Jan. 4, 2012.

(51) Int. Cl.  
*H03H 7/30* (2006.01)  
*H03H 7/40* (2006.01)  
*H03K 5/159* (2006.01)  
*H04L 25/03* (2006.01)

(52) U.S. Cl.  
CPC ............... *H04L 25/03968* (2013.01)

(58) Field of Classification Search  
CPC .... A61B 5/7203; A61B 5/7246; A61B 5/725; H04N 13/0055; H04N 13/0468; H04N 13/146; H04N 13/0059; H04W 52/241; H04W 52/325; H04W 52/146  
See application file for complete search history.

(56) References Cited

U.S. PATENT DOCUMENTS

| 5,568,558 | A | 10/1996 | Ramm et al. |
| 5,572,552 | A | 11/1996 | Dent et al. |
| 5,687,162 | A | 11/1997 | Yoshida et al. |
| 6,034,986 | A | 3/2000 | Yellin et al. |
| 6,151,358 | A | 11/2000 | Lee et al. |

(Continued)

FOREIGN PATENT DOCUMENTS

| EP | 0721264 A | 7/1996 |
| WO | 9818210 A | 4/1998 |

(Continued)

OTHER PUBLICATIONS

3GPP TR 25.848, 3rd Generation Partnership Project; Technical Specification Group Radio Access Network; Physical layer aspects of UTRA High Speed Downlink Packet Access (Release 4), V4.0.0, 89 pages, Mar. 2001.

(Continued)

*Primary Examiner* — Chieh M Fan  
*Assistant Examiner* — Wednel Cadeau (57) ABSTRACT

A method includes, in a mobile communication terminal, storing a mathematical model for computing a covariance matrix of data conveying signals that are received at the mobile communication terminal. At least a first data conveying signal is received in the mobile communication terminal, and one or more signal components required by the model are extracted from the first data conveying signal. A determination is made whether the model is suitable for computing the covariance matrix for the first data conveying signal based on a predefined rule. The covariance matrix is computed in the mobile communication terminal using at least one of the model and an empirical-based estimation of the covariance matrix. The covariance matrix is selected in response to the determination.

25 Claims, 2 Drawing Sheets

(56) References Cited

U.S. PATENT DOCUMENTS

| | | | |
|---|---|---|---|
| 6,879,623 B2 | 4/2005 | Agami et al. | |
| 7,042,926 B2 | 5/2006 | Yellin et al. | |
| 7,058,116 B2 | 6/2006 | Moshavi et al. | |
| 7,139,592 B2* | 11/2006 | Leifer et al. | 455/562.1 |
| 7,957,485 B2* | 6/2011 | Cairns et al. | 375/267 |
| 8,098,717 B1 | 1/2012 | Griniasty | |
| 8,175,135 B1 | 5/2012 | Griniasty | |
| 8,351,487 B1 | 1/2013 | Griniasty | |
| 2002/0136158 A1 | 9/2002 | Frank | |
| 2003/0022636 A1 | 1/2003 | Ylitalo et al. | |
| 2003/0081701 A1 | 5/2003 | Pick et al. | |
| 2003/0095588 A1 | 5/2003 | Yellin et al. | |
| 2003/0142732 A1 | 7/2003 | Moshavi et al. | |
| 2004/0017867 A1* | 1/2004 | Thomas et al. | 375/346 |
| 2004/0042532 A1* | 3/2004 | Artamo et al. | 375/148 |
| 2004/0125898 A1 | 7/2004 | Ariyavisitakul et al. | |
| 2004/0136444 A1 | 7/2004 | Massicotte et al. | |
| 2004/0141548 A1 | 7/2004 | Shattil | |
| 2004/0174939 A1 | 9/2004 | Wang | |
| 2005/0094713 A1 | 5/2005 | Yellin | |
| 2007/0117527 A1 | 5/2007 | Xu et al. | |
| 2010/0124895 A1* | 5/2010 | Martin et al. | 455/276.1 |

FOREIGN PATENT DOCUMENTS

| | | |
|---|---|---|
| WO | 0122609 A1 | 3/2001 |
| WO | 2005046075 A1 | 5/2005 |
| WO | WO 2009025611 A3 * | 4/2009 |

OTHER PUBLICATIONS

Motorola, "Revised HSDPA UE Performance Requirements," TSG-RAN Working Group 4, Meeting #21, Sophia Antipolis, France, 11 pages, Jan. 28-Feb. 1, 2002.

Ericsson, "Comments on the CPICH Interference Cancellation Scheme," TSG-RAN Working Group 4 (Radio), Meeting #20, East Brunswick, USA, 4 pages, Nov. 12-16, 2001.

Verdu, S. "Multiuser Detection", Cambridge University Press, pp. 154-213, 234-272, 288-329, 344-387, year 1998.

3GPP TR 25.101, "3rd Generation Partnership Project; Technical Specification Group Radio Access Network; User Equipment (UE) radio transmission and reception (FDD) (Release 8)", V8.0.0 Technical Report, 163 pages, Sep. 2007.

Bottomley et al., "A Generalized RAKE Receiver for Interference Suppression", IEEE Journal on Selected Areas in Communications, vol. 18, No. 8, pp. 1536-1545, Aug. 2000.

Lenardi et al., "SINR maximizing equalizer receiver for DS-CDMA", Proceedings of 10th European association for signal processing conference (EUSIPCO), Tampere, Finland, 5 pages, Sep. 4-9, 2000.

Lenardi et al., "A Rake receiver with intracell interference cancellation for a DS-CDMA synchronous downlink with orthogonal codes", Proceedings of the IEEE 51st Vehicular Technology Conference, vol. 1, pp. 430-434, Tokyo, Japan, 5 pages, May 15-18, 2000.

Hooli et al., "Inter-path Interference Suppression in WCDMA Systems with Low Spreading Factors", IEEE 50th Vehicular Technology Conference, vol. 1, pp. 421-425, Amsterdam, Netherlands, Sep. 19-22, 1999.

Hooli et al., "Performance Evaluation of Adaptive Chip-Level Channel Equalizers in WCDMA Downlink", Proceedings of the IEEE International Conference on Communications, vol. 6, pp. 1974-1979, Helsinki, Finland, Jun. 11-14, 2001.

AT&T et al., "Specification of enhanced performance requirements type 3i for HSDPA based on two-branch equaliser with interference cancellation", Change Request, 3GPP TSG-RAN 4, meeting # 45, Jeju, Korea, 14 pages, Nov. 5-9, 2007.

3GPP ESTI 125.101, "3rd Generation Partnership Project; Universal Mobile Telecommunication System (UMTS); User Equipment (UE) radio transmission and reception (FDD) (Release 8)", V8.6.0 Technical Report, 216 pages, Mar. 2009.

Lohan et al., "Highly Efficient Techniques for Mitigating the Effects of Multipath Propagation in DS-CDMA Delay Estimation", IEEE Transactions on Wireless Communications, vol. 4, No. 1, pp. 149-162, Jan. 2005.

U.S. Appl. No. 12/612,695 Official Action dated Oct. 12, 2011.

International Application PCT/US2000/022504 Search report dated Nov. 30, 2000.

U.S. Appl. No. 13/726,126, dated Dec. 23, 2012.

Frank et al., "Adaptive Interference Suppression for the Downlink of a Direct Sequence CDMA System with Long Spreading Sequences", Journal of VLSI signal processing systems for signal, image and video technology, vol. 30, issue 1-3, pp. 273-291, year 2002.

Grant et al., "Generalized RAKE Receivers for MIMO Systems", Proceedings of the 58th IEEE Vehicular Technology Conference, vol. 1, pp. 424-428, Oct. 2003.

Kim et al., "Linear MMSE Space-Time Equalizer for MIMO Multicode CDMA Systems", IEEE transactions on Communications, vol. 54, No. 10, pp. 1710-1714, Oct. 2006.

Hadinejad-Mahram et al., "Performance Evaluation of Advanced Receivers for WCDMA Downlink Detection", Proceedings of the International Symposium on Wireless Personal Multimedia Communications, pp. 367-371, Oct. 2002.

Hadinejad-Mahram, H, "On the Equivalence of Linear MMSE Chip-Level Equalizer and Generalized RAKE", IEEE Communications Letters, vol. 8, No. 1, pp. 7-8, Jan. 2004.

* cited by examiner

ADAPTIVE SIGNAL COVARIANCE ESTIMATION FOR MMSE EQUALIZATION

CROSS-REFERENCE TO RELATED APPLICATIONS

This application claims the benefit of U.S. Provisional Patent Application 61/583,128, filed Jan. 4, 2012, whose disclosure is incorporated herein by reference.

FIELD OF THE DISCLOSURE

The present disclosure relates generally to communication systems, and particularly to methods and systems for signal processing in communication receivers.

BACKGROUND

Many communication receivers use adaptive equalizers for filtering received signals. For example, U.S. Pat. No. 7,428,260, whose disclosure is incorporated herein by reference, describes a unified Minimum-Mean-Square-Error (MMSE) equalization/Multi-User Detection (MUD) approach for demodulating Direct-Sequence CDMA (DS-CDMA) signals. The unified approach is capable of generating a variety of receiver demodulation techniques that may range from, for example, a low cost linear MMSE equalization technique to a relatively high complexity MMSE MUD.

As another example, U.S. Pat. No. 8,098,717, whose disclosure is incorporated herein by reference, describes a method for communication including receiving signals at a receiver from multiple sources, including a target signal transmitted by a given transmitter, and estimating a channel response from the given transmitter to the receiver. A filter response is computed by taking a sum including a first autocorrelation of the received signals with a second autocorrelation of the channel response, and applying the sum to the estimated channel response. The filter response is applied to the received signals in order to recover the target signal.

The description above is presented as a general overview of related art in this field and should not be construed as an admission that any of the information it contains constitutes prior art against the present patent application.

SUMMARY

An embodiment that is described herein provides a method including, in a mobile communication terminal, storing a mathematical model for computing a covariance matrix of data conveying signals that are received at the mobile communication terminal. At least a first data conveying signal is received in the mobile communication terminal, and one or more signal components required by the model are extracted from the first data conveying signal. A determination is made whether the model is suitable for computing the covariance matrix for the first data conveying signal based on a predefined rule. The covariance matrix is computed in the mobile communication terminal using at least one of the model and an empirical-based estimation of the covariance matrix. The covariance matrix is selected in response to the determination.

In some embodiments, the method further includes adapting a Minimum Mean Square Error (MMSE) equalizer using the selected covariance matrix, and applying the adapted MMSE equalizer to the first data conveying signal. In a disclosed embodiment, determining whether the model is suitable includes assessing whether the extracted signal components are sufficient for computing the model. In an embodiment, receiving the first data conveying signal includes receiving at least the data conveying signal from a serving cell and from one or more additional cells, and assessing whether the extracted signal components are sufficient includes assessing availability of the information relating to the additional cells.

In another embodiment, determining whether the model is suitable includes evaluating the predefined rule at least over one or more external parameters that are not part of the received signal. In an example embodiment, evaluating the rule over the external parameters includes querying a list of neighboring base stations.

In yet another embodiment, determining whether the model is suitable includes evaluating the received signal prior to filtering by the equalization coefficients. In still another embodiment, determining whether the model is suitable includes verifying whether sufficient computational power is available for computing the covariance matrix using the model.

In a disclosed embodiment, determining whether the model is suitable includes verifying whether the received data conveying signal is transmitted using transmit diversity. In an embodiment, determining whether the model is suitable includes estimating a first covariance matrix using the model, estimating a second covariance matrix using the empirical estimation, and comparing the first covariance matrix to the second covariance matrix.

In an embodiment, selecting the covariance matrix includes selecting, in response to the determination, whether to compute the model or the empirical-based estimation. In an alternative embodiment, computing the covariance matrix includes computing both the model and the empirical-based estimation, and selecting the covariance matrix includes selecting one of the model and the empirical-based estimation in response to the determination.

In some embodiments, computing the covariance matrix includes computing a first covariance matrix using the model and a second covariance matrix using the empirical estimation, and selecting the covariance matrix includes producing a weighted covariance matrix in which the first and second covariance matrices are weighted by relative weights derived from the rule. In an embodiment, the method includes modifying the covariance matrix computed using the empirical-based estimation.

There is additionally provided, in accordance with an embodiment that is described herein, apparatus including a receiver front end, a memory and processing circuitry. The receiver front end is configured to receive data conveying signals. The memory is configured to store a mathematical model for computing a covariance matrix of the data conveying signals. The processing circuitry is configured to extract one or more signal components required by the model from at least a first data conveying signal received by the receiver front end, to determine whether the model is suitable for computing the covariance matrix for the first data conveying signal based on a predefined rule, to compute the covariance matrix using at least one of the model and an empirical-based estimation of the covariance matrix, and to select the covariance matrix in response to the determination.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and systems for computing covariance matrices of received signals in communication receivers. The covariance matrix is also referred to as a signal autocorrelation matrix, and is defined explicitly further below. An example use of the covariance matrix is in adapting a Minimum-Mean-Square-Error (MMSE) equalizer that equalizes the received signal. Alternatively, however, the covariance matrix computed using the disclosed techniques can be used for various other purposes, such as, for example, in echo cancellation.

In some embodiments, a mobile communication terminal is served by a serving base station (BS). A receiver in the terminal receives a signal that comprises one or more signal components, e.g., a signal component received from the serving BS, one or more signal components received from other BSs, and/or one or more noise components. The receiver computes the covariance matrix of the received signal, adapts coefficients of a MMSE equalizer using the covariance matrix, and applies the adapted MMSE equalizer to the received signal.

In the disclosed embodiments, the receiver selects whether to compute the covariance matrix using a model-based computation or using an empirical computation. A model-based covariance computation computes the covariance matrix as a function of second-order statistics of one or more of the received signal components. An empirical covariance computation computes the covariance matrix by multiplying pairs of time-shifted replicas of the received signal, typically regardless of the underlying signal structure or components.

The model-based covariance computation and the empirical covariance computation have different advantages and disadvantages, and each computation type outperforms the other in different scenarios. For example, the model-based computation is potentially more accurate in estimating the covariance than the empirical computation, provided that the individual signal components are known with sufficient accuracy. The empirical computation is simpler and does not require knowledge of the individual signal components, but is often less accurate than the model-based computation.

In some embodiments, the receiver evaluates a predefined rule in order to select between the model-based and the empirical covariance computations. This rule may indicate, for example, whether there is sufficient knowledge of the individual received signal components for computing the model. In one embodiment, the rule depends on the received signal. For example, the received signal can be analyzed to determine the presence or absence of strong BSs in the vicinity of the terminal. In other embodiments the rule is defined based on external information, which is available to the terminal and indicates the number of expected received BS signal components.

Several examples of rules and selection strategies are described herein. One example strategy selects the model-based computation when fading is flat (i.e., not frequency-selective) and the Signal-to-Noise Ratio (SNR) is high ("single-path, high-SNR scenario"), and selects the empirical covariance computation otherwise.

The methods and systems described herein are highly effective in matching the covariance computation type to the actual current circumstances, so as to exploit the advantages and avoid the disadvantages of each respective type of computation. In a MMSE equalization application, for example, the MMSE equalizer can be adapted with high accuracy over a wide range of signal environments.

Figure 1:
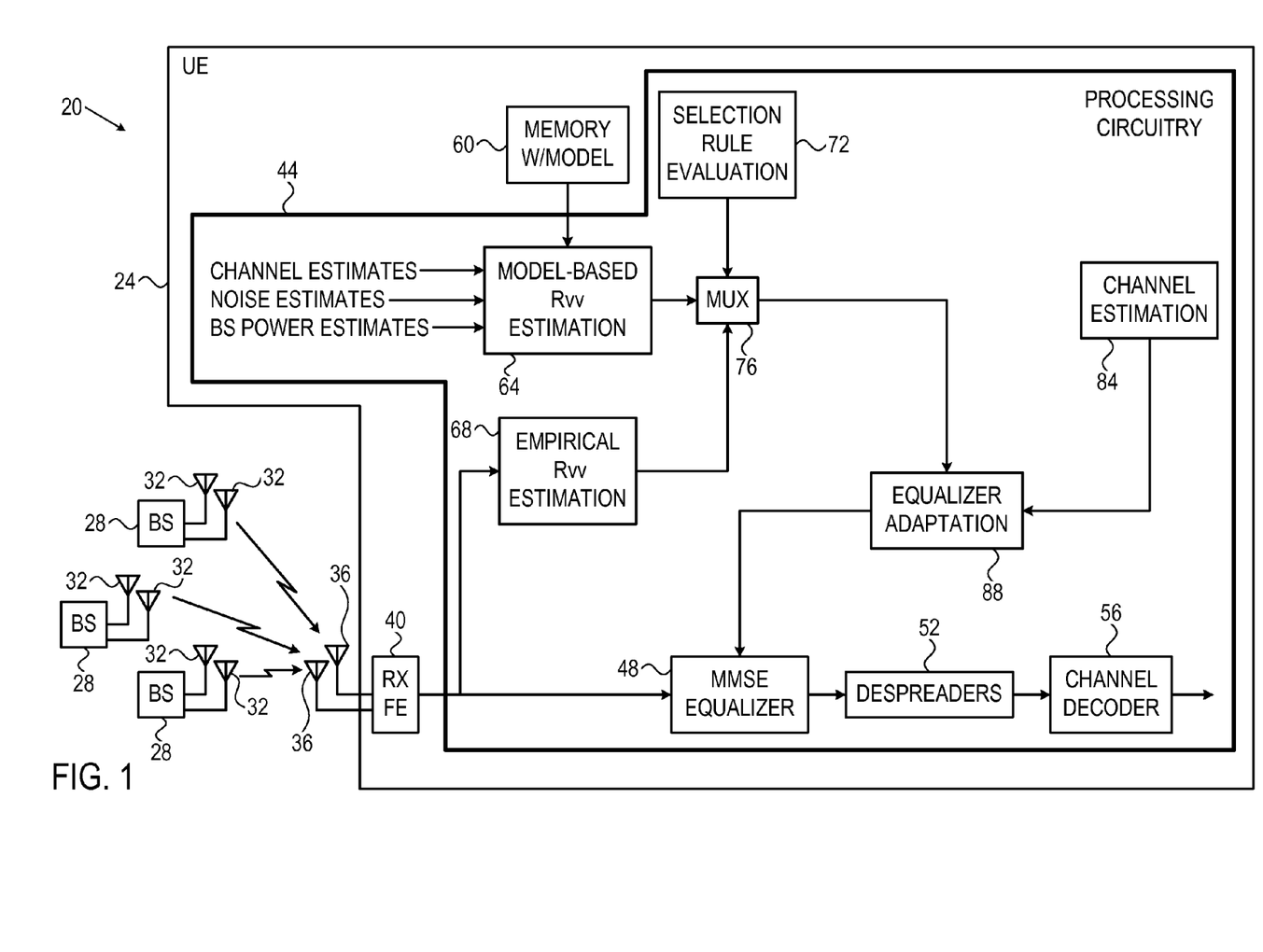
FIG. 1 is a block diagram that schematically illustrates a mobile communication terminal in a wireless communication system, in accordance with an embodiment that is described herein.

FIG. 1 is a block diagram that schematically illustrates a mobile communication terminal operating in a wireless communication system 20, in accordance with an embodiment that is described herein. In the embodiments described herein, system 20 operates in accordance with one or more Code Division Multiple Access (CDMA) communication protocols, such as Wideband CDMA (WCDMA), Universal Mobile Telecommunications System (UMTS), Long Term Evolution (LTE) or LTE-Advanced (LTE-A). Alternatively, however, system 20 may operate in accordance with any other suitable communication protocol.

System 20 comprises Base Stations (BSs) 28 that communicate with terminals 24. Each BS comprises one or more transmit antennas 32 for transmitting signals to the terminals. Depending on the applicable protocol, BSs 28 are also referred to as NodeBs or eNodeBs, and terminals 24 are also referred to as Mobile Stations (MSs) or User Equipment (UE). Although the example of FIG. 1 shows a simplified configuration of three BSs and a single terminal for the sake of clarity, real-life systems typically comprise a large number of BSs and a large number of terminals. Each terminal 24 may comprise, for example, a cellular phone, a wireless-enabled personal computing device, or any other suitable type of communication terminal.

BSs 28 transmit data-conveying Radio Frequency (RF) signals to terminals 24 in accordance with the applicable air interface. At a given time, one of BSs 28 is defined as the serving BS of terminal 24, i.e., the BS via which the terminal communicates. The signal received by terminal 24 thus comprises one or more signal components, e.g., a signal component received from the serving BS, one or more signal components received from other BSs (typically regarded as interference), and a noise component.

Terminal 24 comprises one or more receive antennas 36, for receiving the RF signals from BSs 28. For the case of B BSs and K terminals, the received signal vector from any of antennas 36 of terminal 24 can be written as:

$$v = \sum_{b}^{B} H_b \sum_{k}^{K} \tilde{c}_{b,k} + \eta \qquad \text{Equation 1}$$

wherein $\tilde{c}_{b,k}$ denotes the combined CDMA chip/symbol for terminal k from BS b. The average received power per chip for terminal k from BS b is $[|\tilde{c}_{b,k,t}|^2]$, with t referring to a particular chip in the vector. $H_b$ denotes the multipath channel matrix of BS b.

Each column of $H_b$ represents the multipath waveform of a different chip. Since the multipath channel typically does not change over a small time window, the different columns (excluding the edges) comprise vertically-shifted replicas of the same vector, with a vertical shift that increases from chip to chip. Matrix $H_b$ is therefore a Toeplitz matrix. $\eta$ denotes the noise vector.

Without loss of generality, it is assumed in the present example that the received signal is processed at the chip rate, i.e., at a rate of one sample per chip. The processing window comprises a total of N chips. Vector v is thus an N-element vector.

When terminal 24 comprises two receive antennas 36, for example, Equation 1 can be used to represent the received signal with $$v = \begin{bmatrix} v_1 \\ v_2 \end{bmatrix}$$

denoting the received signal from the first and second antennas ($v_1$, $v_2$, respectively), and $$H_b = \begin{bmatrix} H_{b,1} \\ H_{b,2} \end{bmatrix}$$

denoting the multipath channel matrix for the two receive antennas, arranged one on top of the other. Similarly, $\eta$ comprises noise samples from the two antennas, arranged one on top of the other.

In the example of FIG. 1, terminal 24 comprises a receiver front-end (RX FE) 40 that receives the RF signals, converts the signals to baseband, and performs various other conventional functions such as low-noise amplification, filtering, gain control and digitization.

Terminal 24 further comprises processing circuitry 44, which processes the digitized baseband signal so as to extract the data sent to the terminal. In the present example, processing circuitry 44 comprises a linear adaptive Minimum-Mean-Square-Error (MMSE) equalizer 48, which filters the baseband signal so as to compensate, for example, for the response of the communication channel. Equalizer 48 typically comprises a set of adaptive coefficients (also referred to as taps) that are adapted in order to best match the current signal and channel conditions.

The computation of the linear MMSE equalizer minimizes the MMSE:

$$\min E \left| \sum_{k}^{K} \tilde{c}_{b0,k,t} - w^H v \right|^2 \quad \text{Equation 2}$$

wherein $\tilde{c}_{b0,k,t}$ denotes the sum over K codes of the combined chip/symbol values from the desired BS b0 (the serving BS), at delay t, and $$w^H = [w_1^H \quad w_2^H]$$

denotes the equalizer coefficients for each receive antenna to be solved for.

The solution for the equalizer coefficient vector w is given by:

$$w = E[vv^H]^{-1} E \left[ v \sum_k^K \tilde{c}_{b0,k,t}^* \right] = \quad \text{Equation 3}$$

-continued $$EcR_{vv}^{-1} H\delta_t = Ec \begin{pmatrix} E[v_1 v_1^H] & E[v_1 v_2^H] \\ E[v_2 v_1^H] & E[v_2 v_2^H] \end{pmatrix}^{-1} \begin{bmatrix} h_{t,1} \\ h_{t,2} \end{bmatrix}$$

$$= E_c \begin{pmatrix} \sum_b^B Ior_b H_{b,1} H_{b,1}^H + \sigma_1^2 & \sum_b^B Ior_b H_{b,1} H_{b,2}^H \\ \sum_b^B Ior_b H_{b,2} H_{b,1}^H & \sum_b^B Ior_b H_{b,2} H_{b,2}^H + \sigma_2^2 \end{pmatrix}^{-1} \begin{bmatrix} h_{t,1} \\ h_{t,2} \end{bmatrix}$$

$$= Ec \begin{pmatrix} \sum_b^B Ior_b T_{b,1,1} + \sigma_1^2 & \sum_b^B Ior_b T_{b,1,2} \\ \sum_b^B Ior_b T_{b,2,1} & \sum_b^B Ior_b T_{b,2,2} + \sigma_2^2 \end{pmatrix}^{-1} \begin{bmatrix} h_{t,1} \\ h_{t,2} \end{bmatrix}$$

wherein $Ior_b$ denotes the averaged received signal power from BS b, and Ec denotes the averaged received signal power from the desired K codes received from the serving BS.

In Equation 3, $$R_{vv} = \begin{pmatrix} E[v_1 v_1^H] & E[v_1 v_2^H] \\ E[v_2 v_1^H] & E[v_2 v_2^H] \end{pmatrix}$$

denotes the covariance matrix of the received signal v. Matrix $R_{vv}$ is a positive-definite Hermitian matrix, which comprises four blocks. Each of the blocks has a Toeplitz structure. Matrix H denotes the channel matrix for the desired (serving) BS, $\delta_t$ denotes a selector vector that is all-zero except for the $t^{th}$ element—i.e., a vector that selects the $t^{th}$ column of H, and $\sigma_a^2$ denotes the noise power seen at receive antenna a.

The channel correlation matrices $T_{a1,a2}$ are Toeplitz matrices, such that the first column represents the autocorrelation (when a1=a2) or the cross-correlation (when a1≠a2) between the antenna multipath channels:

Equation 4:

$$T_{a1,a2}(j, 0) = \sum_n h_{t,a1,n} h_{t,a2,n-j}^*, \; j = 1, 2, \ldots, N$$

The description above assumes that all signals are transmitted from a single BS antenna. In some embodiments, however, the BS uses transmit diversity, in which case the equations above are slightly modified: Consider, for example, the Space-Time Transmit Diversity (STTD) and Closed Loop Transmit Diversity (CLTD) modes used in various Third Generation Partnership Project (3GPP) standards. When using STTD, each BS contributes two channel autocorrelation terms in Equation 3—one term for the primary BS transmit antenna channel and one for the diversity BS transmit antenna channel. In CLTD, each terminal will contribute its own channel autocorrelation term based on the combined effective channel that results from the weights applied for its primary and/or diversity antenna transmissions at the BS. Similarly, Multiple-Input Multiple-Output (MIMO) terminals will each have their own effective channel (or channels in the case of multiple streams) based on the precoding weights used at the BS transmit antennas.

In STTD, since the BS transmits using both a primary channel and a diversity channel, there are two $h_t$ vectors (see Equation 3). Thus, separate MMSE equalizers typically are needed for the primary and diversity channels. Similarly, in two-stream MIMO, a separate $h_t$ vector exists for each stream, again leading to a need for two MMSE equalizers. In the case of CLTD or single-stream MIMO, $h_t$ is defined as the effective desired user channel (equivalent to combining the primary and diversity channels with the weights applied by the BS on transmission).

Returning now to FIG. 1, in some embodiments processing circuitry 44 calculates the equalizer coefficients based on, among other factors, the covariance matrix $R_{vv}$ of the received signal (also referred to as an autocorrelation matrix). Example techniques for computing the covariance matrix are described in detail below.

The equalized signal at the output of equalizer 48 is de-spread by a bank of de-spreaders 52. Each de-spreader 52 de-spreads the Direct-Sequence (DS) code of a respective CDMA channel. The de-spread signal is then decoded by a channel decoder 56, which extracts and outputs the data conveyed over the various CDMA channels.

As noted above, processing circuitry 44 computes the covariance matrix of the received signal, and adapts MMSE equalizer 48 based on the covariance matrix. In the disclosed embodiments, the processing circuitry selects whether to compute the covariance matrix using a model-based computation or using an empirical computation.

A model-based covariance computation computes the covariance matrix based on channel estimation, and as a function of second-order statistics of one or more of the received signal components. This sort of computation typically requires estimation of the channel response from each BS, the power of each BS, and the noise power per receive antenna.

In a typical implementation, in order to use the model-based covariance computation, processing circuitry is required to accurately model the second-order statistics of the various signal components. When multiple BSs are present, it is typically necessary to identify the significant (e.g., strong) BSs and estimates their channel responses and power levels. In addition, it is typically necessary to identify and model the noise correlation matrix. When the noise can be modeled as Additive White Gaussian Noise (AWGN), the noise correlation matrix can be represented as a diagonal matrix with the signal noise power on the diagonal. For multiple receive antennas 36, it may be necessary to estimate the noise power on each antenna separately. Moreover, in order to use model-based covariance computation it is typically necessary to consider the signal format, e.g., whether the signals are transmitted with no transmit diversity, STTD, CLTD, or MIMO formats (as well as the specific CLTD weights or MIMO precoding weights that are being used).

An empirical covariance computation, on the other hand, computes the covariance matrix by multiplying pairs of time-shifted replicas of the received signal, typically regardless of the underlying signal structure or components. In a CDMA signal, an empirical computation empirically multiplies (correlates) the received chips is order to estimate the covariance matrix $$R_{vv} \approx \begin{pmatrix} R_{1,1} & R_{1,2} \\ R_{2,1} & R_{2,2} \end{pmatrix}$$

wherein $R_{a1,a2}$ denotes the received signal correlation matrix between the chips received at antenna a1 and the chips received at antenna a2. All four blocks $R_{a1,a2}$ are Toeplitz matrices that are fully defined by their first column or row:

$$R_{a1,a2}(j, 0) = \sum_n v_{a1,n} v^*_{a2,n-j}, \quad j = 0, 2, \ldots, N \qquad \text{Equation 5}$$

Since $R_{vv}$ is Hermitian, the first row of $R_{1,2}$ is equal to the conjugate of the first column of $R_{2,1}$, and the first column of $R_{1,2}$ is equal to the conjugate of the first row of $R_{2,1}$.

Because of the different characteristics of model-based covariance computation and empirical covariance computation, each computation type has different advantages and disadvantages, and each computation type outperforms the other in different scenarios. In some embodiments, processing circuitry 44 selects whether to use model-based covariance computation or empirical covariance computation on a case-by-case basis, and is able to alternate between the two computation types as needed.

In the example of FIG. 1, terminal 24 comprises a memory 60, which stores a mathematical model for computing the received signal covariance matrix $R_{vv}$ as a function of the parameters described above. Processing circuitry 44 comprises a model-based estimation module 64, which computes matrix $R_{vv}$ using model-based computation in accordance with the model stored in memory 60. Module 64 accepts one or more of the above-described parameters as input, in the present example channel response estimates, noise power estimates and BS power estimates.

Processing circuitry 44 further comprises an empirical estimation module 68, which computes matrix $R_{vv}$ directly from the received signal using an empirical computation, as described above.

A selection rule evaluation module 72 evaluates one or more predefined rules, which specify whether to use the model-based or the empirical covariance computation. Several examples of such rules are given further below. Module 72 controls a multiplexer (MUX) 76, which selects between model-based estimation module 64 and empirical estimation module 68 depending on the evaluated rule.

In some embodiments, for example for the sake of system efficiency in some hardware-based systems and/or for achieving timing constraints of a telecommunication standard, modules 64 and 68 compute both the model-based estimation and the empirical estimation regardless of the rule evaluation, and the selection in MUX 76 is then made based on the rule evaluation with one computation being used and the other computation being discarded. Alternatively, in other embodiments, the suitability of the model-based estimation or the empirical estimation is first determined by module 72, and then the model or empirical computation is made using either module 64 or module 68 as applicable.

A channel estimation module 84 estimates the response of the communication channel between the serving BS and the terminal. The outputs of modules 80 and 84 are provided to an equalizer adaptation module 88, which adapts the coefficients (taps) of MMSE equalizer 48. Thus, the equalizer is adapted using either model-based covariance computation or empirical covariance computation, depending on the predefined rules of module 72.

The configuration of terminal 24 and processing circuitry 44 shown in FIG. 1 are example configurations, which are depicted in a highly simplified manner solely for the sake of clarity. In alternative embodiments, any other suitable terminal and processing circuitry configuration can be used. Elements that are not mandatory for understanding of the disclosed techniques, for example elements relating to uplink communication of the terminal, have been omitted from the figure for the sake of clarity.

In various embodiments, some or all of the elements of terminal 24, including RX FE 40, memory 60 and processing circuitry 44, are implemented in hardware, such as implementing RX FE 40 using one or more Radio Frequency Integrated Circuits (RFICs), implementing processing circuitry 44 using one or more Field-Programmable Gate Arrays (FPGAs) or Application-Specific Integrated Circuits (ASICs), or implementing memory 60 using a suitable Random Access Memory (RAM) or Flash memory. In alternative embodiments, certain elements of terminal 24 are implemented in software, or using a combination of hardware and software elements. In some embodiments, the RX FE, memory and processing circuitry are implemented in a signal-processing chipset in terminal 24.

In some embodiments, certain elements of processing circuitry 44 are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In various embodiments, selection rule evaluation module 72 evaluates different rules and uses different selection strategies for selecting whether to use model-based or empirical covariance computation. Generally speaking, the model-based computation is potentially more accurate in computing the covariance than the empirical computation, provided that the individual signal components are known with sufficient accuracy. The empirical computation, on the other hand, is simpler and does not require knowledge of the individual signal components, but is often less accurate than the model-based computation.

Thus, in an example embodiment, selection rule evaluation module 72 assesses whether the available information regarding the various signal components is sufficient for performing the model-based covariance computation. If the information is sufficient (e.g., if the channel estimates and power levels for the various BSs as well as the noise levels are known with sufficient accuracy) then module 72 selects the model-based covariance computation. If the information is insufficient, module 72 reverts to the empirical covariance computation.

Consider, for example, an embodiment in which the processing circuitry is able to model the channel response and power for the serving BS (along with the noise) but not for other BSs. This limitation may be due, for example, to limited computation power or for any other reason. In this embodiment, if the processing circuitry detects the presence of additional significant signal components (e.g., strong neighboring BSs), module switches to the empirical computation. If no additional significant signal components are detected, module 72 switches to the model-based computation.

Detection of significant signal components can be performed either by analyzing the received signal, or by accessing additional information other than the received signal. In an example embodiment, terminal 24 maintains a list of neighboring BSs and their respective signal strengths, for example in order to support hand-off and cell reselection processes. In CDMA the list is sometimes referred to as a soft-handoff active set. In this embodiment, module 72 is able to deduce the presence or absence of strong neighboring BSs (and thus strong additional signal components) by accessing this list.

In an alternative embodiment, module 72 assesses whether significant additional signal components are present by comparing the covariance matrix produced by the empirical computation to the covariance matrix produced by a model-based computation that considers only the serving cell. If the two covariance matrices are similar, module 72 concludes that no significant additional signal components are present.

More generally, in some embodiments module 72 compares the covariance matrix produced by the empirical computation to the most accurate covariance matrix that the UE is able to produce using the model-based computation. If the two matrices are sufficiently similar, module 72 selects the model-based computation. If not, module 72 selects the empirical computation.

Modeling of interfering signals is particularly important, for example, when the terminal comprises more than a single receive antenna 36. In such embodiments, the extra degrees of freedom offered by the multiple receive antennas allows the terminal to enhance the serving BS signal while nulling-out the effect of interfering signals. On the other hand, the empirical covariance computation could potentially limit the achievable reception quality, thus preventing the terminal from achieving very high performance under favorable conditions.

Thus, in an example embodiment, module 72 selects the model-based computation when fading is flat (i.e., not frequency-selective) and the Signal-to-Noise Ratio (SNR) of the received signal is high ("single-path, high-SNR scenario"). Otherwise, module 72 reverts to the empirical covariance computation. In another embodiment, module 72 selects the model-based computation when detecting a "single-path single-BS" scenario, i.e., channel with flat fading and no additional significant signal components. Otherwise, module 72 reverts to the empirical covariance computation otherwise. These techniques enable terminal 24 to achieve very high throughput (because of highly accurate equalization) in high-SNR, flat-fading, low-interference scenarios.

When terminal 24 comprises two or more receive antennas, it may be problematic for module 72 to switch to the model-based computation whenever single-path high-SNR conditions are identified. For example, the high SNR may have been achieved because of the spatial processing ability of the multiple-antenna MMSE equalizer to suppress or null-out a significant interferer. Assuming that the terminal is only able to model the serving BS, the terminal will be unable to exploit this sort of spatial processing gain after switching from the empirical computation to the model-based computation. One possible solution is to de-spread and process the signal received over the main channel tap before the equalizer is applied. If high SNR is identified (before equalization) then there are most likely no significant interferers. Thus, in this embodiment, module 72 selects the model-based computation if the SNR before equalization is high, and reverts to the empirical computation otherwise.

In other embodiments, module 72 selects the covariance computation type based on whether or not the serving BS uses transmit diversity. When transmit diversity is not used, module 72 selects the model-based covariance computation. When transmit diversity is used, module 72 reverts to the empirical covariance computation. This technique is useful, for example, because it avoids the need to model the CLTD or MIMO weights used by the BS (which are usually unavailable to the terminal, unless the transmission is directed at the terminal).

The selection rules described above are described solely by way of example. In alternative embodiments, module 72 in processing circuitry 44 of terminal 24 may use any other suitable rule or rules for selecting between model-based and empirical covariance computation.

Figure 2:
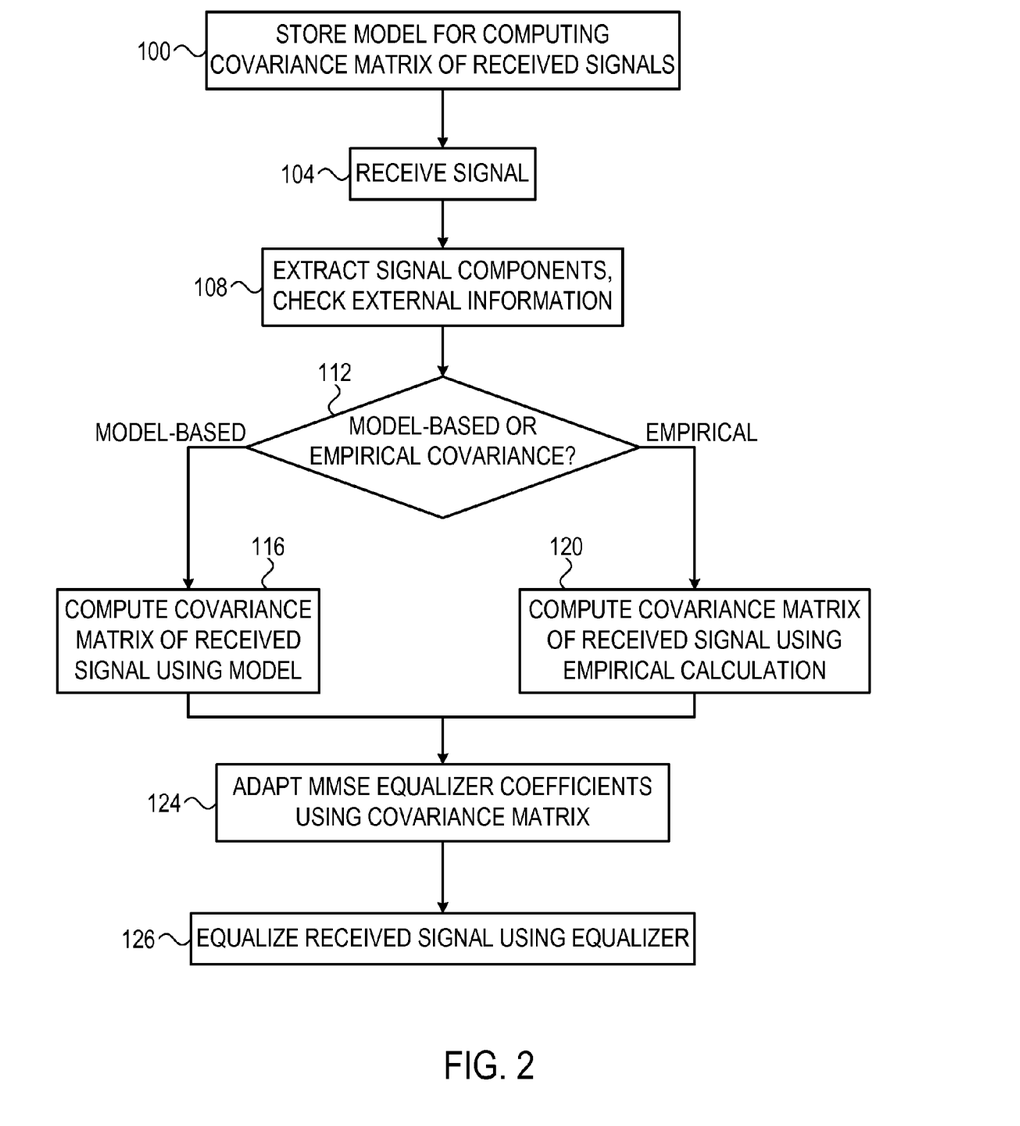
FIG. 2 is a flow chart that schematically illustrates a method for signal equalization, in accordance with an embodiment that is described herein.

FIG. 2 is a flow chart that schematically illustrates a method for signal equalization, in accordance with an embodiment that is described herein. The method begins with terminal 24 storing in memory 60 a mathematical model for performing model-based computation of received signal covariance matrices, at a model storage operation 100.

RX FE 40 of terminal 24 receives a signal, at a reception operation 104. Processing circuitry 44 of terminal 24 extracts the various signal components from the received signal, at a component extraction operation 108. The signal components comprise, for example, a signal component received from the serving BS, one or more signal components received from other BSs, and/or one or more noise components.

Selection rule evaluation module 72 of terminal 24 evaluates one or more predefined rules so as to select whether to compute the received signal covariance matrix using model-based or empirical computation, at a selection operation 112. If the rule indicates that the computation is to be model-based, module 72 controls MUX 76 to select model-based estimation module 64, and module 64 computes the covariance matrix in accordance with the model stored in memory 60, at a model-based computation operation 116. If, on the other hand, the rule indicates that the computation is to be empirical, module 72 controls MUX 76 to select empirical estimation module 68, and module 68 computes the covariance matrix, at an empirical computation operation 120.

(As noted above, in alternative embodiments, both the model-based estimation and the empirical estimation are computed, and the selection in MUX 76 is then made based on the rule evaluation. In these embodiments, operations 116 and 120 are carried out before operation 112, and operation 112 selects between the two pre-computed covariance matrices.)

Equalizer adaptation module 88 adapts the coefficients of MMSE equalizer 48 using the covariance matrix computed by module 64 or module 68, at an equalizer adaptation operation 124. Equalizer 48 equalizes the received signal using the adapted coefficients, at an equalization operation 126. The equalized signal is then provided to de-spreaders 52 and decoder 56 for decoding.

The flow of operations shown in FIG. 2 is chosen solely for the sake of conceptual clarity. In alternative embodiments, processing circuitry 44 may carry out any other suitable flow of operations in order to implement the disclosed techniques.

In alternative embodiments, processing circuitry 44 of terminal 24 combines the model-based and empirical computations rather than select one of them. In these embodiments, processing circuitry 44 evaluates a predefined rule that produces relative weights to be applied between the model-based and empirical computations. The processing circuitry then computes a composite covariance matrix that comprises a weighted combination of the covariance matrices produced by the model-based and empirical computations. The relative weights of the two matrices in the composite matrix are determined by the rule.

In some embodiments, module 68 modifies the empirically-computed covariance matrix so as to improve performance. In one embodiment, referred to as "diagonal loading," module 68 adds a constant value to the diagonal of the empirically-computed covariance matrix. In an alternative embodiment, module 69 adds to the empirically-computed covariance matrix a diagonal matrix, whose diagonal contains more than a single constant value. In yet another embodiment, module 68 adds to the empirically-computed covariance matrix a scaled version of the desired base channel autocorrelation. In these embodiments, module 72 and MUX 76 select between the model-based covariance matrix and the modified empirically-computed covariance matrix.

Although the embodiments described herein mainly address selection between model-based and empirical computation of a covariance matrix, the methods and systems described herein can also be used in other applications.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a mobile communication terminal, storing a mathematical model for computing a covariance matrix of signals that are received at the mobile communication terminal;
receiving a signal in the mobile communication terminal;
assessing whether individual signal components, over which the mathematical model is defined, are available to the mobile communication terminal with at least a predefined accuracy, by detecting at least one individual signal component which is present in the received signal but which the terminal is incapable of modeling;
when the individual signal components are available with at least the predefined accuracy, computing the covariance matrix using the mathematical model;
when the individual signal components are not available with at least the predefined accuracy, empirically estimating the covariance matrix by multiplying pairs of time-shifted replicas of the signal; and
adapting an equalizer using the covariance matrix, and applying the adapted equalizer to the received signal.

2. The method according to claim 1, wherein adapting and applying the equalizer comprises adapting and applying a Minimum Mean Square Error (MMSE) equalizer.

3. The method according to claim 1, wherein assessing whether the individual signal components are available comprises evaluating one or more external parameters that are not part of the received signal.

4. The method according to claim 1, wherein assessing whether the individual signal components are available comprises evaluating the received signal prior to filtering by equalization coefficients.

5. The method according to claim 1, wherein assessing whether the individual signal components are available comprises verifying whether sufficient computational power is available for computing the individual signal components.

6. The method according to claim 1, wherein assessing whether the individual signal components are available comprises verifying whether the received signal is transmitted using transmit diversity.

7. The method according to claim 1, wherein assessing whether the individual signal components are available comprises estimating a first covariance matrix using the model, empirically estimating a second covariance matrix, and concluding that the individual signal components are available upon finding a match between the first covariance matrix to the second covariance matrix.

8. The method according to claim 1, comprising computing a first covariance matrix using the mathematical model and empirically estimating a second covariance matrix, and selecting the first covariance matrix or the second covariance matrix based on whether the individual signal components are available.

9. The method according to claim 1, comprising computing a first covariance matrix using the model and empirically estimating a second covariance matrix, and producing a weighted covariance matrix in which the first and second covariance matrices are weighted by relative weights.

10. The method according to claim 1, comprising modifying the empirically estimated covariance matrix.

11. The method according to claim 1, wherein storing the mathematical model comprises expressing the covariance matrix by second-order statistics of the individual signal components of the received signals.

12. The method according to claim 1, wherein assessing whether the individual signal components are available comprises assessing whether the terminal is capable of distinguishing, with at least the predefined accuracy, between the individual signal components originating respectively from a serving base station, from one or more other base stations, and from noise.

13. The method according to claim 1, wherein assessing whether the individual signal components are available with at least the predefined accuracy comprises detecting at least one individual signal component, which is present in the received signal but which the terminal is incapable of modeling.

14. The method according to claim 3, wherein evaluating the external parameters comprises querying a list of neighboring base stations.

15. Apparatus, comprising:
   a receiver front end, which is configured to receive signals;
   a memory, which is configured to store a mathematical model for computing a covariance matrix of the signals; and
   processing circuitry, which is configured to assess whether individual signal components, over which the mathematical model is defined, are available with at least a predefined accuracy, by detecting at least one individual signal component which is present in the received signal but which the processing circuitry is incapable of modeling, and wherein the processing circuitry is further configured to compute the covariance matrix using the mathematical model when the individual signal components are available with at least the predefined accuracy, to empirically estimate the covariance matrix by multiplying pairs of time-shifted replicas of the signal when the individual signal components are not available with at least the predefined accuracy, to adapt an equalizer using the covariance matrix, and to apply the adapted equalizer to the received signal.

16. The apparatus according to claim 15, wherein the equalizer comprises a Minimum Mean Square Error (MMSE) equalizer.

17. The apparatus according to claim 15, wherein the processing circuitry is configured to assess whether the individual signal components are available by evaluating one or more external parameters that are not part of the received signal.

18. The apparatus according to claim 15, wherein the processing circuitry is configured to assess whether the individual signal components are available by verifying whether sufficient computational power is available for computing the individual signal components.

19. The apparatus according to claim 15, wherein the processing circuitry is configured to assess whether the individual signal components are available by verifying whether the received signal is transmitted using transmit diversity.

20. The apparatus according to claim 15, wherein the processing circuitry is configured to compute a first covariance matrix using the model and to empirically estimate a second covariance matrix, and to compute a weighted covariance matrix in which the first and second covariance matrices are weighted by relative weights.

21. A mobile communication terminal comprising the apparatus of claim 15.

22. A chipset for processing signals in a mobile communication terminal, comprising the apparatus of claim 15.

23. The apparatus according to claim 15, wherein the mathematical model expresses the covariance matrix by second-order statistics of the individual signal components of the received signals.

24. The apparatus according to claim 15, wherein the processing circuitry is configured to assess whether the individual signal components are available by assessing whether the processing circuitry is capable of distinguishing, with at least the predefined accuracy, between the individual signal components originating respectively from a serving base station, from one or more other base stations, and from noise.

25. The apparatus according to claim 15, wherein the processing circuitry is configured to assess whether the individual signal components are available with at least the predefined accuracy, by detecting at least one individual signal component, which is present in the received signal but which the processing circuitry is incapable of modeling.

* * * * *